United States Patent [19]

Cotton et al.

[11] Patent Number: 5,676,334
[45] Date of Patent: Oct. 14, 1997

[54] CYCLIC MINIMIZER THROUGH ALIGNMENT OF THE CENTER OF GRAVITY AND DIRECTION OF FLIGHT VECTORS

[75] Inventors: Bryan S. Cotton, Monroe; Christopher A. Thornberg, Newtown, both of Conn.

[73] Assignee: Sikorsky Aircraft Corporation, Stratford, Conn.

[21] Appl. No.: 576,603

[22] Filed: Dec. 21, 1995

[51] Int. Cl.$^6$ .......................... B64C 17/00; B64C 19/00; B64C 13/20
[52] U.S. Cl. ..................... 244/17.13; 244/17.23; 244/175; 244/190; 244/23 C; 244/12.2
[58] Field of Search .................. 244/17.11, 17.13, 244/17.19, 17.23, 17.25, 175, 190, 23 C, 12.2

[56] References Cited

U.S. PATENT DOCUMENTS

| | | | |
|---|---|---|---|
| 3,175,786 | 3/1965 | Frank et al. | 244/17.13 |
| 3,507,461 | 4/1970 | Rosta | 244/17.23 |
| 4,007,893 | 2/1977 | Khachikian . | |
| 4,120,468 | 10/1978 | Fischer . | |
| 4,307,856 | 12/1981 | Walker | 244/23 C X |
| 4,478,379 | 10/1984 | Kerr | 244/17.23 X |
| 5,058,824 | 10/1991 | Cycon et al. | 244/17.13 |
| 5,150,857 | 9/1992 | Moffitt et al. | 244/23 C X |
| 5,351,913 | 10/1994 | Cycon et al. | 244/23 C X |

*Primary Examiner*—William Grant

[57] ABSTRACT

Apparatus and method for controlling an unmanned generally aerodynamically symmetric aircraft includes detecting the presence of misalignment between the horizontal component of the center of gravity vector and the horizontal component of the direction of flight vector and further includes rotating the aircraft to align the horizontal components of the vectors.

38 Claims, 7 Drawing Sheets

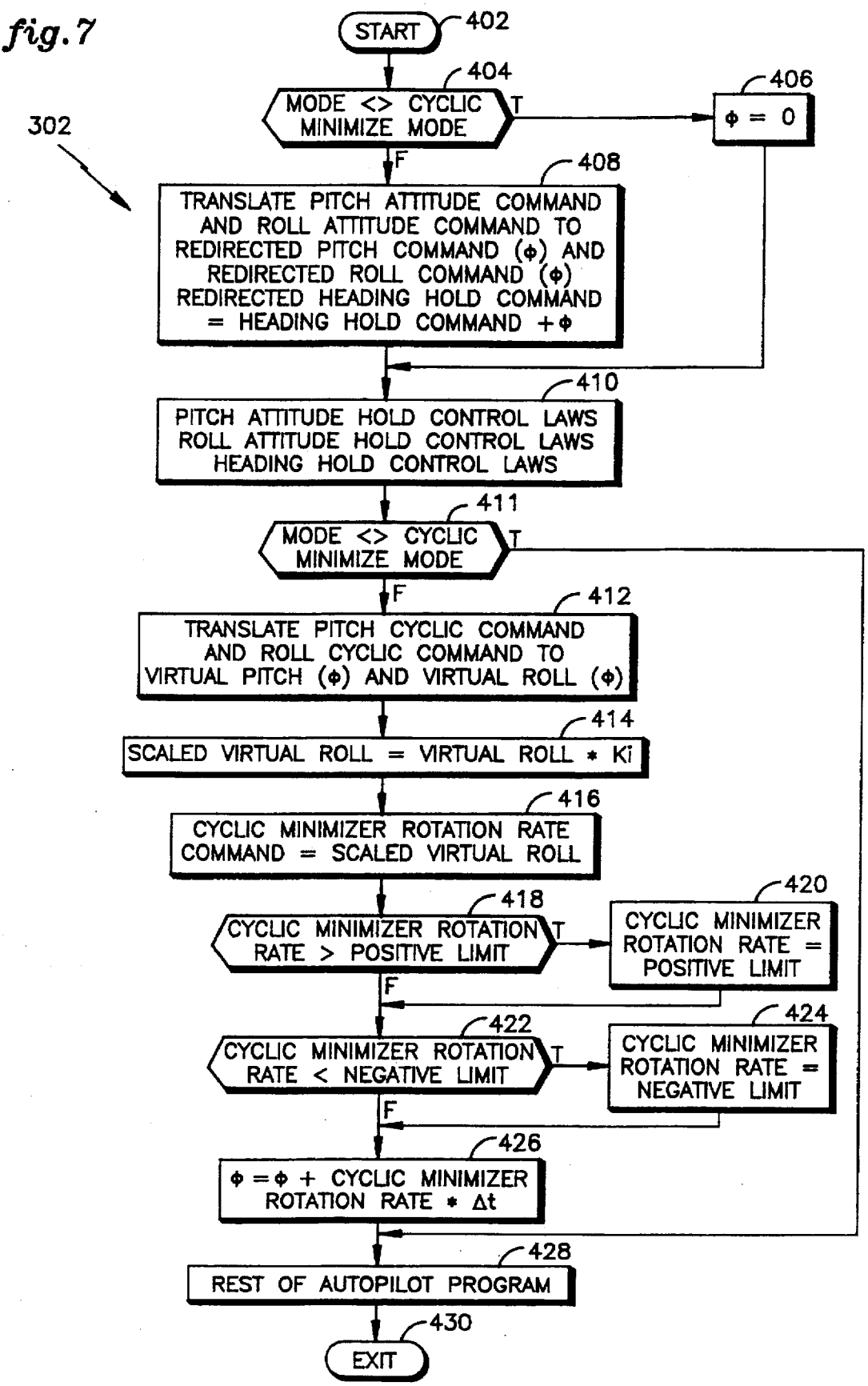

5,676,334

1

CYCLIC MINIMIZER THROUGH ALIGNMENT OF THE CENTER OF GRAVITY AND DIRECTION OF FLIGHT VECTORS

TECHNICAL FIELD

This invention relates to aerial vehicles, and more particularly to aerodynamically symmetric aerial vehicles.

BACKGROUND ART

Rotary wing aircraft having structural and aerodynamic symmetry are well known, such as that disclosed in U.S. Pat. No. 5,351,913. These types of unmanned symmetrical aircraft exhibit equal aerodynamic characteristics regardless of which portion of the airframe is designated as the front. As with all rotary wing aircraft, these aircraft have a center of gravity (CG) that provides a downward force, which produces a moment on the aircraft. The CG is normally represented in inches from one or more datum lines such as a longitudinal datum line located forward of the aircraft and a lateral datum line located on the center. However, moments can be represented from any fixed point, which for the discussion below point is taken to be the center of the rotor system. For a symmetrical craft such as the type disclosed in U.S. Pat. No. 5,351,913, this is also the center of the aircraft. Thus, a two inch forward CG represents a CG that is two inches forward of the center of the craft and may be represented diagrammatically as a vector having its origin at the center of the aircraft with a length representing two inches and a direction pointing forward. A lateral CG can be represented by a vector drawn from the center of the aircraft orthogonal to that drawn for the forward CG. The vector addition of the forward and lateral components produces a horizontal plane CG vector, hereinafter CG vector. The CG vector produces a torque on the airframe equal to the moment about the center of the aircraft with the weight of the aircraft concentrated at the end of the CG vector. Although the forward component nominally aids forward flight, the lateral component must be compensated for with cyclic control power, reducing the cyclic available for other maneuvers and increasing the power demanded from the engine.

An aircraft may be designed so that the CG vector is aligned with the direction of flight, which minimizes the lateral component, although, a zero lateral CG component is difficult to maintain, because non zero lateral CG components are introduced by such factors as fuel burn and placement of cargo, passengers, and equipment.

DISCLOSURE OF INVENTION

An object of the present invention is to provide method and apparatus for controlling a generally aerodynamically symmetric aircraft to align a center of gravity vector with a direction of flight vector, thereby reducing the power required for flight and preserving control range, e.g. cyclic in rotary wing aircraft.

Another object of the present invention is to provide a means for continually aligning the CG vector of an unmanned generally aerodynamically symmetric aircraft with the aircraft direction of flight, thereby reducing the power required for flight and preserving control range, e.g. cyclic in rotary wing aircraft.

According to the present invention apparatus for controlling an unmanned generally aerodynamically symmetric aircraft includes detection means for detecting the presence of misalignment between the horizontal component of the center of gravity vector and the horizontal component of the direction of flight vector, and for providing a rotation signal indicative of the desired rotation of the aircraft to align the horizontal components of the vectors, and further includes rotation means, for providing, in the presence of the rotation signal, rotation of the aircraft to align the horizontal components of the vectors.

In further accord with the present invention apparatus for rotating an unmanned generally aerodynamically symmetric aircraft in its symmetrical axis in the presence of misalignment between the direction of flight horizontal plane component and the center of gravity vector horizontal plane component, includes indication means, for indicating the magnitude and direction of the rotation of the unmanned generally aerodynamically symmetric aircraft, and further includes translation means, responsive to a plurality of input command signals and said indication means, for providing a modification to the plurality of input command signals, and still further includes detection means, responsive to a plurality of control command signals and said indication means, for providing a determination of the presence of misalignment between the direction of flight horizontal plane component and the center of gravity vector horizontal plane component, and yet further includes update means, responsive to said detection means, for providing in the presence of said determination of the presence of misalignment, a modification in the magnitude and the direction of the rotation, and for not providing said modification at all other times;

In further accord with the present invention, apparatus for rotating an unmanned generally aerodynamically symmetric aircraft in its yaw axis in the presence of misalignment between the direction of flight horizontal plane component and the center of gravity vector horizontal plane component, includes indication means for indicating the magnitude and direction of the rotation of the unmanned generally aerodynamically symmetric aircraft, and further includes translation means, responsive to a pitch, roll and yaw axis command signals and said indication means, for providing a modification to the pitch, roll, and yaw axis command signals, and still further includes detection means, responsive to pitch and roll cyclic command signals and said indication means, for providing a determination of the presence of misalignment between the direction of flight horizontal plane component and the center of gravity vector horizontal plane component, and yet further includes update means, responsive to said detection means, for providing in the presence of said determination of the presence of misalignment, a modification in the magnitude and the direction of the rotation, and for not providing said modification at all other times;

In still further accord with the present invention, apparatus for rotating an unmanned generally aerodynamically symmetric aircraft in its yaw axis in the presence of misalignment between the direction of flight horizontal plane component and the center of gravity vector horizontal plane component, includes indication means, for indicating the magnitude and direction of the rotation of the unmanned generally aerodynamically symmetric aircraft, and further includes translation means, responsive to pitch and roll attitude command signals, a heading command signal, and said indication means, for providing a modification to the pitch and roll attitude command signals and heading command signal, and still further includes detection means, responsive to pitch and roll cyclic command signals from an autopilot and said indication means, for providing a determination of the presence of misalignment between the direction of flight horizontal plane component and the center of gravity vector horizontal plane component, and yet further includes update means, responsive to said detection means, for providing in the presence of said determination of the presence of misalignment, a modification in the magnitude and the direction of the rotation, and for not providing said modification at all other times;

In yet further accord with the present invention, apparatus for rotating an unmanned generally aerodynamically symmetric rotary wing aircraft in its yaw axis in the presence of misalignment between the direction of flight horizontal plane component and the center of gravity vector horizontal plane component, includes indication means for indicating the magnitude and direction of the rotation of the unmanned rotary wing generally aerodynamically symmetric aircraft, and further includes translation means, responsive to pitch, roll and yaw axis command signals and said indication means, for providing a modification to the pitch, roll, and yaw axis command signals, and still further includes detection means, responsive to pitch and roll cyclic command signals and said indication means, for providing a determination of the presence of misalignment between the direction of flight horizontal plane component and the center of gravity vector horizontal plane component, and yet further includes update means, responsive to said detection means, for providing in the presence of said determination of the presence of misalignment, a modification in the magnitude and the direction of the rotation, and for not providing said modification at all other times;

In still yet further accord with the present invention, apparatus for rotating an unmanned generally aerodynamically symmetric rotary wing aircraft in its yaw axis in the presence of misalignment between the direction of flight horizontal plane component and the center of gravity vector horizontal plane component, includes indication means, for indicating the magnitude and direction of the rotation of the unmanned generally aerodynamically symmetric rotary wing aircraft, and further includes translation means, responsive to pitch and roll attitude command signals, a heading command signal, and said indication means, for providing a modification to the pitch and roll attitude command signals and heading command signal, and still further includes detection means, responsive to pitch and roll cyclic command signals from an autopilot and said indication means, for providing a determination of the presence of misalignment between the direction of flight horizontal plane component and the center of gravity vector horizontal plane component, and yet further includes update means, responsive to said detection means, for providing in the presence of said determination of the presence of misalignment, a modification in the magnitude and the direction of the rotation, and for not providing said modification at all other times.

The cyclic minimizer of the present invention rotates an unmanned generally aerodynamically symmetric aerial vehicle to align the direction of flight with the CG vector to save power and preserve control range, e.g. cyclic in rotary wing aircraft.

These and other objects, features, and advantages of the present invention will become more apparent in light of the following detailed description of a best mode embodiment thereof, as illustrated in the accompanying drawings.

BRIEF DESCRIPTION OF THE DRAWINGS

FIG. 7 is a flowchart diagram illustrating the steps performed by the cyclic minimizer of the present invention within the flight control embodiment of FIG. 2.

BEST MODE FOR CARRYING OUT THE INVENTION

Figure 1:
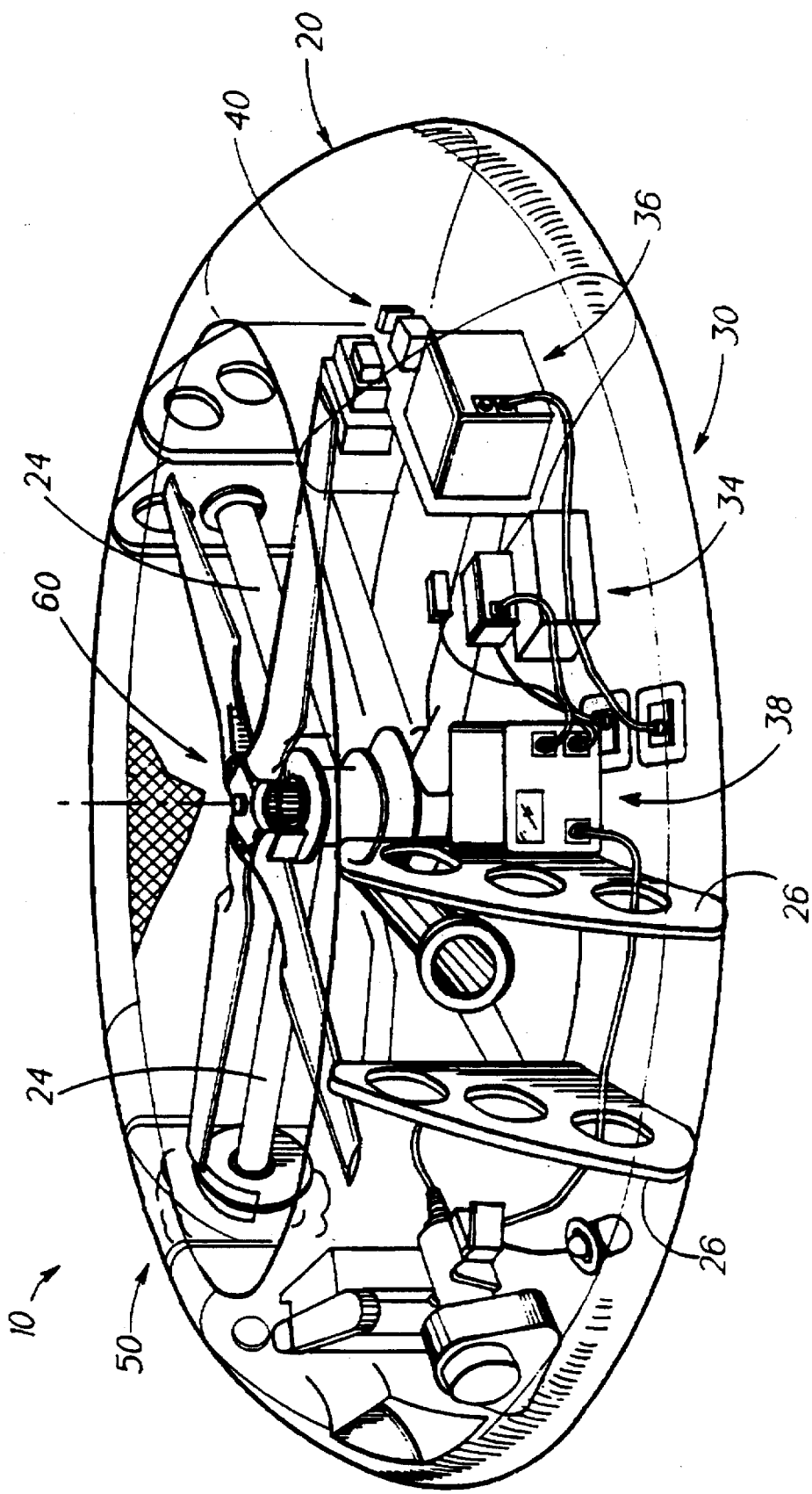
FIG. 1 is a perspective view, partially cut away, of an unmanned aerial vehicle (UAV) of the type in which the cyclic minimizer of the present invention may be used.

The cyclic minimizer of the present invention is disclosed with respect to a best mode embodiment for use in an unmanned aerial vehicle (UAV), of the type illustrated in FIG. 1.

Referring to FIG. 1, a UAV 10 of the type disclosed in U.S. Pat. No. 5,351,913 includes a toroidal-like fuselage 20 which houses, in internal bays 26, the craft's flight/mission equipment 30, power plant subsystem 50, and rotor assembly 60. The fuselage 20 includes structural supports 24 which support the rotor assembly 60 in fixed coaxial relation to the fuselage. The flight/mission equipment 30 includes avionics 34, navigation equipment 36 flight computer 38, and communications equipment 40 (for relaying real time sensor data and receiving real time command input signals).

Figure 2:
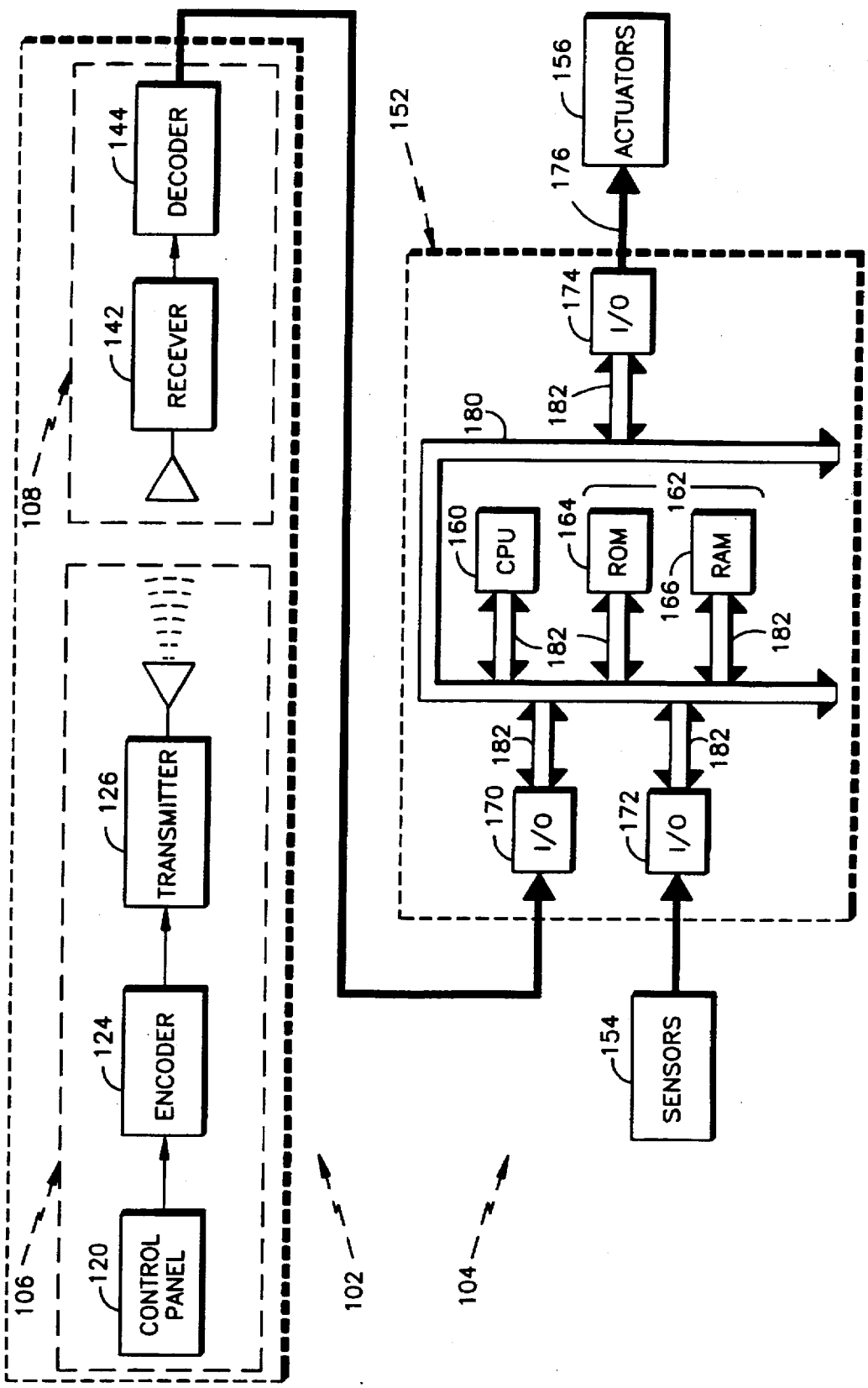
FIG. 2 is a system block diagram of a flight control system of the type used in the UAV of FIG. 1, and which may incorporate the cyclic minimizer of the present invention.

Referring now to FIG. 2, UAV maneuvers are directed, communicated, and implemented by means of uplink and flight control systems, 102 and 104 respectively. The uplink system comprises a ground based portion 106 which is responsive to operator command, and a flight portion 108 which is located in the UAV communication equipment 40 (FIG. 1). The ground portion 106 includes a control panel 120, an encoder 124, and a transmitter 126.

The control panel 120 has a plurality of control mechanisms (not shown) to direct UAV maneuvers. The encoder 124 converts the command signals from the panel 120 to pulse code modulation (PCM) format for transmission by the transmitter 126 to the UAV. The ground transmitted information is received by a receiver 142 within the flight portion 108 and is converted from the PCM format to the command signal format by a decoder 144. The decoded command signals are then presented to the flight control computer 152.

The flight control computer 152 is a component of the flight control system 104, which also includes a plurality of sensors 154 which provide sensed parameter signals to the flight control computer, and a plurality of actuators 156 to control the rotor and throttle under the direction of the flight control computer.

The flight control computer 152 is comprised of a central processing unit 160, a memory section 162 having a read only memory (ROM) portion 164 and a random access memory (RAM) portion 166, an input section 170 for receiving commands from the uplink 102, an input section 172 for receiving signals from the plurality of sensors 154, an output section 174 that sends signals over a plurality of lines 176 to direct the plurality of actuators 156, and a processor bus 180 with interconnections 182 to the elements of the flight control computer 152.

A flight control program stored in the memory section 162 directs the flight control computer 152 to process the input transmitted ground commands signals and, with the aid of the rest of the flight control system 104, initiates the appropriate actions to carry out the commanded maneuvers.

Alternatively, the flight computer may also execute commanded maneuvers stored in the memory section 162. For example, the flight control computer is programmed to monitor the operational status of the uplink 102, and in the event that the uplink 102 becomes inoperable, the flight control computer executes a set of commands stored in the memory section 162 that are designed to maneuver the UAV back to a predetermined location.

Figure 3:
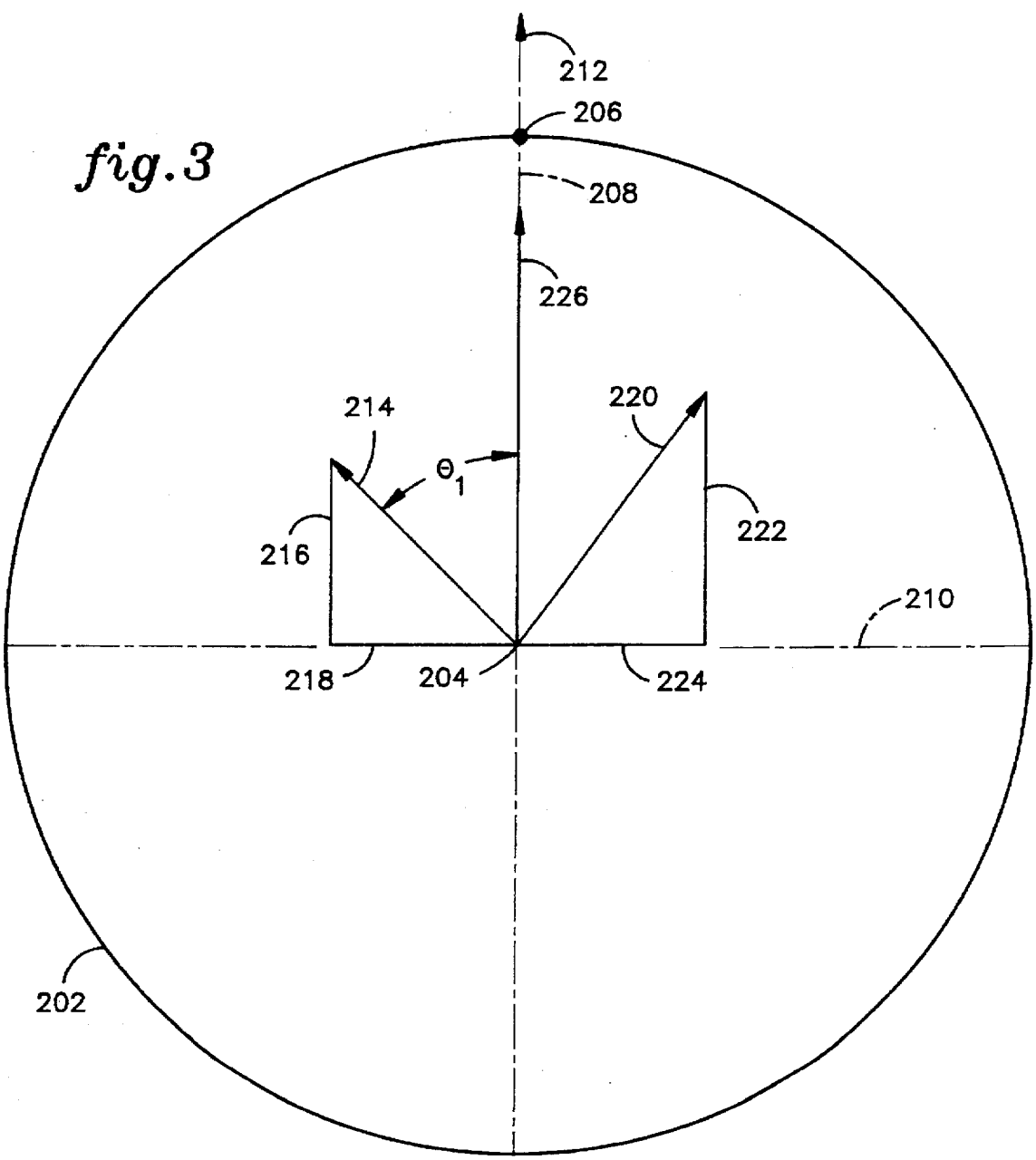
FIG. 3 is a diagrammatic illustration used in the teaching of the principles of operation of the cyclic minimizer of the present invention.

Referring now to FIG. 3, in a diagrammatic illustration used only for the purpose of teaching the principles of the present invention, a circle 202 is representative of the outer periphery of the symmetrical aircraft. The aircraft has a geometric center 204, and an actual front 206, designated to establish a positional reference system for the UAV flight control system 104 (FIG. 2).

An actual roll axis 208 passes through the geometric center 204 and the actual front 206. An actual pitch axis 210, passes through the geometric center 204 orthogonal to the actual roll axis 208. An arrowhead 212 shows an assumed direction of flight of the UAV, which is the direction that the vehicle moves through the airmass and which is not affected by wind, in contrast to the ground track which is affected by wind.

The vectors described hereinbelow, illustrated in FIG. 3-5 as solid lines with arrowheads, each have a magnitude, represented by its length, and a direction. A horizontal plane component 214 of a CG vector, hereinafter CG vector, radiates from the geometric center 204 and has a direction relative to the direction of flight 212 of the aircraft, represented by an angle θ (theta), shown here as $\theta_1$. The CG vector 214 is composed of a forward component 216, in the direction of flight 212, and a lateral component 218, perpendicular to the direction of flight 212.

The UAV employs conventional helicopter controls including roll cyclic, which generates a moment about the actual roll axis 208, represented by an actual roll control component 224, and pitch cyclic, which generates a moment about the actual pitch axis 210, represented by an actual pitch control component 222. The vector addition of the two components is a resultant control vector 220, hereinafter control vector. The control vector 220 can also be mathematically broken down into forward and lateral components relative to the direction of flight 212, which in this orientation are equal to the actual pitch and roll control components because the actual front 206 is aligned with the direction of flight 212.

The control vector 220 has a magnitude and direction which adds with the CG vector 214 to produce a net horizontal plane vector 226, hereinafter net vector, radiating from the geometric center 204 and having a magnitude and direction that brings the aircraft to the desired speed and direction. For purposes of clarity in teaching the present invention, other forces contributing to the net vector, such as short term wind gusts, have been ignored. It should also be recognized that steady state wind does not contribute to the net vector since it is instead countered with changes in aircraft heading, which is with respect to the ground, and the direction of flight remains the same. The difference between the heading and the ground track is referred to as crab angle. Therefore, the direction of the net vector 226 is always in the direction of flight 212 assuming that the UAV is cruising without changing its direction of flight.

As shown, the actual front 206 of the UAV is aligned with the direction of flight 212 but the CG vector 214 is not. This represents an orientation of the UAV prior to alignment of the CG vector 214 with the direction of flight 212.

For the purpose of teaching the present invention, the desired magnitude of the net vector 226 is selected to be 50%. The magnitude of the CG vector 214 is designated as 30%, and the direction $\theta_1$ is 45 degrees (°) to the left of the direction of flight 212. This results in a forward component 216 of 21.21% and a lateral component 218 of −21.21%, where relative to the direction of flight, forward and right are positive, and backward and left are negative. Therefore, the control vector 220 must mathematically be comprised of a forward component of 50%−21.21%=28.79%, and a lateral component of 0%−21.21%=21.21% to balance against the lateral component 218 of the CG vector 214. These components are produced by actual pitch and roll control components 222, 224 having the same magnitudes as the forward and lateral components because the actual axes are aligned with the forward and lateral directions here. The resulting magnitude of the control vector 220 is 35.76%.

Figure 4:
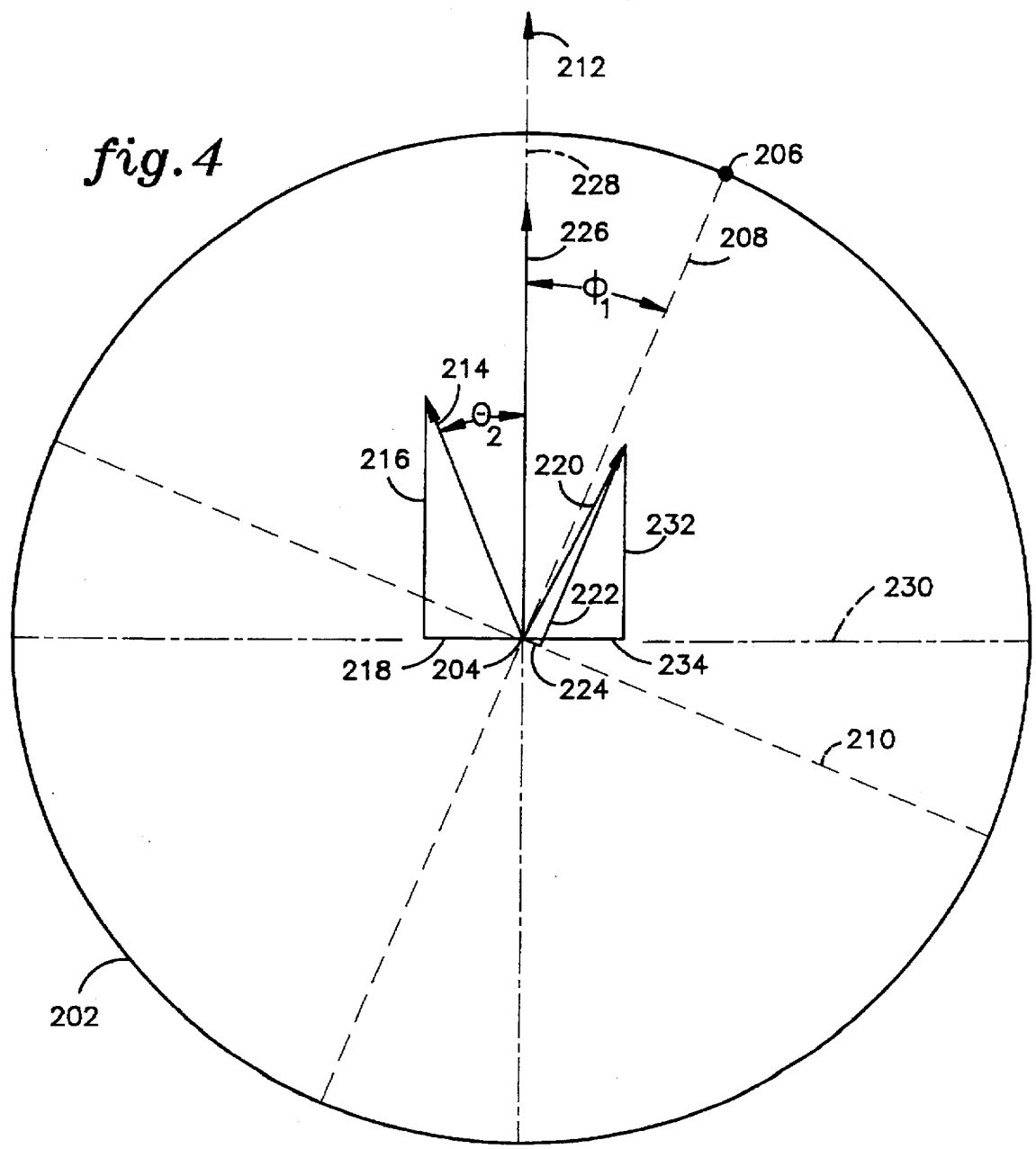
FIG. 4 is another diagrammatic illustration used in the teaching of the principles of operation of the present invention.

Referring now to FIG. 4, continuing the example of FIG. 3, the UAV is partially rotated to the right by an angle $\phi_1 = 22.5°$, such that the CG vector 214 is closer to alignment with the direction of flight 212. In this orientation, virtual axes, which are based upon the direction of flight 212, are now evident. A virtual roll axis 228 passes through the geometric center 204 and the direction of flight 212, and a virtual pitch axis 230 passes through the geometric center 204 orthogonal to the virtual roll axis 228. In FIG. 3, the virtual roll and pitch axes were co-linear with the actual roll and pitch axes, and therefore not evident, because the actual front 206 was aligned with the direction of flight 212.

It is now also evident that the forward 216 and lateral 218 components of the CG vector 214 are in the directions of the virtual roll and pitch axes 228, 230 respectively. Likewise, a forward component 232 and a lateral component 234 which mathematically comprise the control vector 220 are also in the directions of the virtual axes.

The net vector 226 still has a magnitude of 50% and the CG vector 214 still has a magnitude of 30%, however, by partially rotating the UAV, the angle between the CG vector 214 and the direction of flight is reduced to $\theta_2 = \theta_1 - \phi_1 = 22.5°$ and the forward 216 and lateral 218 components of the CG vector 214 are now 27.72% and −11.48 respectively. Therefore, the control vector 220 must mathematically be comprised of a forward component 232 of 50%−27.72%= 22.28%, and a lateral component 234 of 11.48%. These components are actually produced by the actual pitch control component 222 of 24.98%, and the actual roll control component 224 of 2.08%. The forward/lateral and actual pitch/roll control components are no longer equivalent because the actual front 206 is no longer aligned with the direction of flight 212. The resulting magnitude of the control vector 220 is 25.07%.

Figure 5:
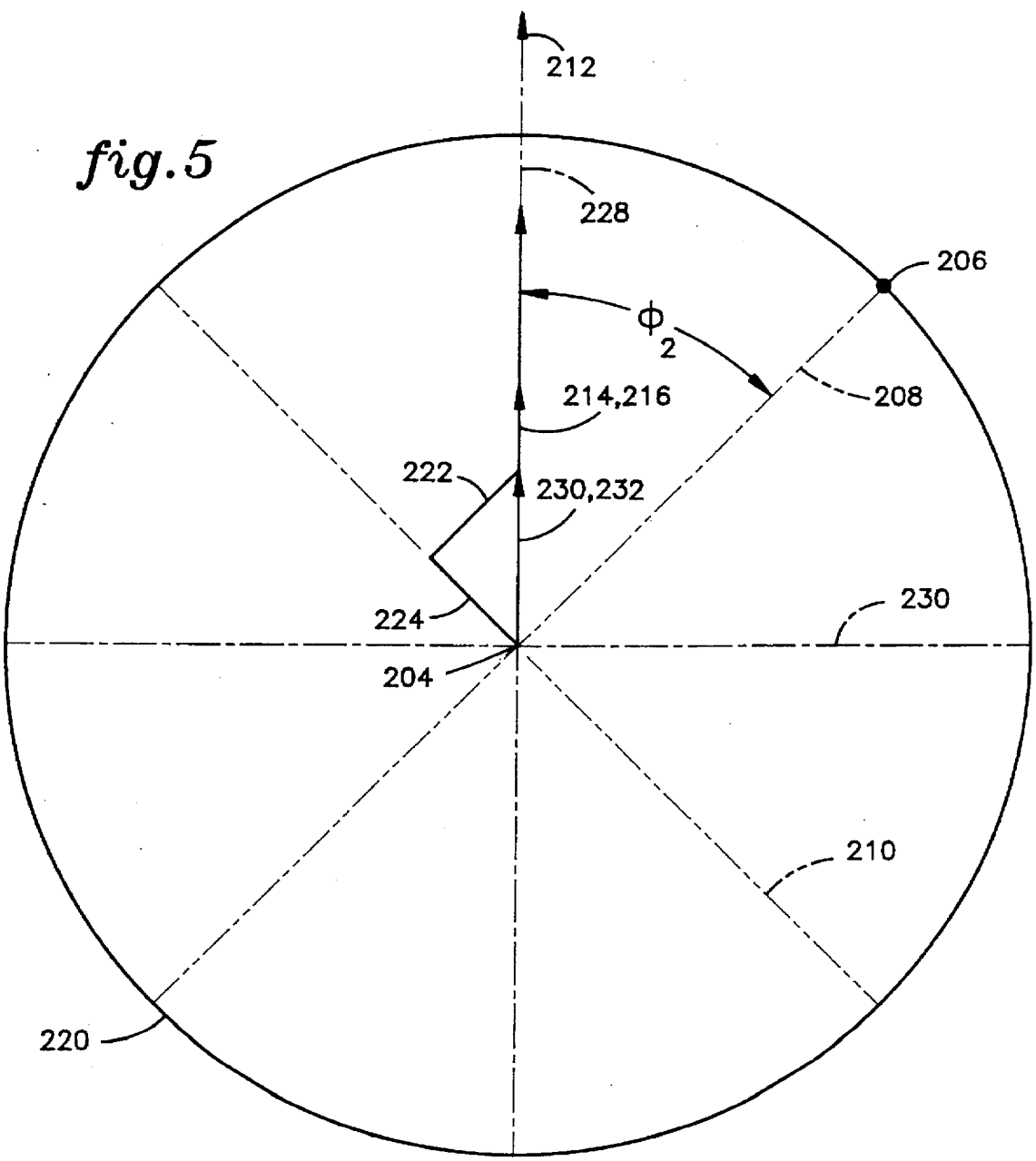
FIG. 5 is yet another diagrammatic illustration used in the teaching of the principles of operation of the present invention.

Referring now to FIG. 5, continuing the example of FIGS. 3 and 4, the UAV is further rotated to the right to an angle $\phi_2 = 45°$ such that the CG vector 214 is in full alignment with the direction of flight 212. The net vector 226 has a magnitude of 50% and the CG vector 214 has a magnitude of 30%, however, the forward component 216 of the CG vector 214 is now 30%, equal in magnitude and co-linear with the CG vector 214, and the lateral component is now zero. Therefore, the control vector 220 must mathematically be comprised of a forward component 232 of 50%−30.00%= 20.00%, co-linear with the control vector 220, and a lateral component of zero. These components are actually produced by actual pitch control component 222 of 14.14%, and an actual roll control component 224 of −14.14%. The resulting magnitude of the control vector is 20.00%.

In the example shown, the control vector is reduced from 35.76% in FIG. 3 to 20.00% in FIG. 5, yet the net vector remains the same. Thus, by aligning the CG vector with the direction of flight, less cyclic and power are required to maintain the aircraft at the same speed and direction of flight.

Figure 6:
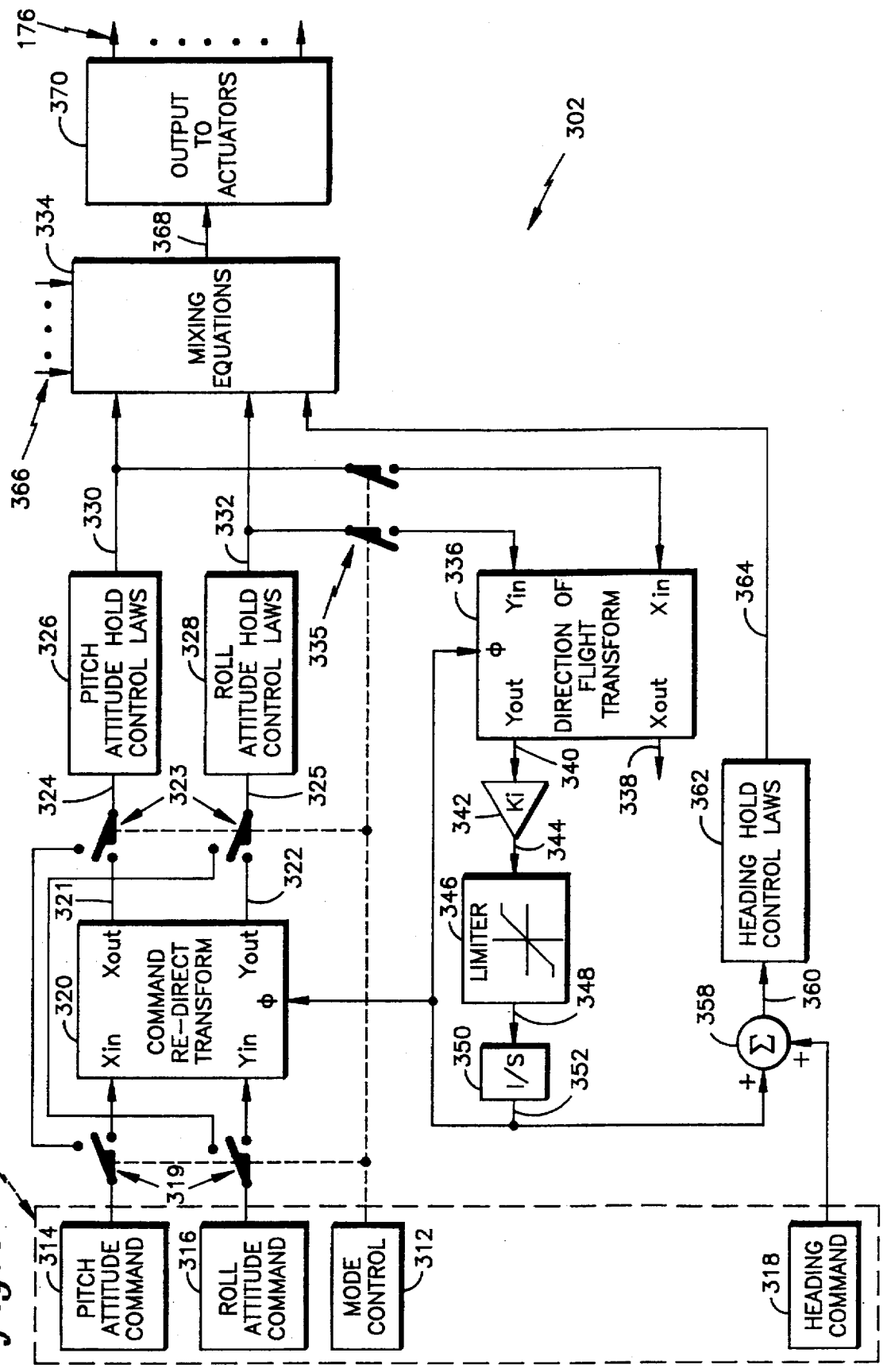
FIG. 6 is a functional block diagram of the cyclic minimizer of the present invention.

Referring now to FIG. 6, a portion 302 of an autopilot program, hereinafter autopilot program, receives input signals 310, which include a mode control signal 312, a pitch attitude command signal 314, a roll attitude command signal 316, and a heading command signal 318. The input signals 310 are commands that are either sent from the ground over the uplink 102 to the flight control computer 152, or generated by the flight control computer 152 if the flight control computer is executing commands stored in memory 162.

The mode control signal 312 indicates which of the autopilot program's operating modes, cyclic minimizer mode or normal mode, is in effect. In cyclic minimizer mode the autopilot program 302 will direct the UAV in such a way that the UAV is rotated to align the CG vector with the direction of flight. In normal mode the autopilot program will not so align the CG vector and the aircraft will cruise with the designated front facing the direction of flight.

The pitch attitude command signal 314, roll attitude command signal 316 and heading command signal 318, are in reference to the virtual roll and pitch axes 228, 230, described above and diagrammatically illustrated in FIGS. 3–5, which are positioned based upon the direction of flight and do not reflect any rotation of the aircraft by the flight computer in aligning the CG vector with the direction of flight. The virtual axes are distinguished from the actual roll and pitch axes 208, 210 (FIGS. 3–5), which are the positional reference system for the UAV flight control computer 152 (FIG. 2) and used by the computer in operating the actuators 156 (FIG. 2), which do reflect any rotation of the aircraft, φ, by the flight computer in aligning the CG vector with the direction of flight.

In operation, the pitch attitude command signal 314, and roll attitude command signal 316 are presented to a first set of switches 319, shown illustratively as two single pole-double throw configurations with their open/closed state controlled by the mode control block 312. The switches 319 are both in a normally closed state for cyclic minimize mode and normally open state for normal mode. In reality the switches 319 do not transition from open to closed state in a discrete step, but fade in and out in a gradual manner.

Normally closed state outputs of the first set of switches 319 are presented to a command re-direct transform block 320, however, normally open state outputs bypass the transform block 320 to avoid unnecessary processing when the autopilot program 302 is not in cyclic minimize mode. The transform block 320 produces redirected pitch and roll attitude command signals on lines 321 and 322 which are in reference to the actual roll and pitch axes 208, 210 (FIGS. 3–5) and reflect the extent of rotation φ. To do this, the transform 320 uses the following translation of axes equations which mathematically project the commands signals 314, 316 from the virtual axes onto the actual axes and produce the corresponding redirected command signals 321, 322 referenced to the actual axes:

redirected pitch=(pitch attitude command)*(cos (φ))−(roll attitude command)*(sin (φ));

redirected roll=(pitch attitude command)*(sin (φ))+(roll attitude command)*(cos (φ)).

If φ is zero, i.e. no rotation, then the redirected commands will be the same as the input commands.

Although, the present embodiment produces redirected commands using translation of axis equations to modify the attitude commands for the amount of rotation commanded by the cyclic minimizer, any other suitable method known to those skilled in the art may be used, which may include but is not limited to, a lookup table in memory in conjunction with φ and the pitch and attitude commands or φ and the ratio of the pitch attitude command to roll attitude command. It is also believed that linear approximations may be used if φ is not too large, although with lower fidelity.

The sign convention in the UAV 10, is arbitrary but consistent throughout the flight control system. For pitch attitude commands, positive refers to nose up, backward flight, and negative refers to nose down, forward flight. For roll attitude commands, positive refers to right side down, rightward flight, and negative refers to left side down, leftward flight. For yaw commands, heading or rotation, positive is to the right and negative is to the left.

The redirected pitch and roll command signals on lines 321, 322 and the normally open state outputs of the first set of switches 319 are passed to a second set of switches 323, which are similar to the first set of switches 319. In the normally closed state, the second set of switches 323 output the re-directed pitch and roll commands, and in the normally open state, they output the normally open state outputs from the first set of switches 319.

The outputs of the second set of switches 323 pass through lines 324, 325 to pitch and roll attitude hold control law blocks 326, 328, which produce corresponding pitch cyclic and roll cyclic command signals on lines 330, 332. The pitch cyclic and roll cyclic command signals, represented in FIGS. 3–5 by the control vector's 220 actual pitch and roll control components 222, 224, are each sent to a set of mixing equations 334 and fed back to a third set of switches 335.

The third set of switches 335 are illustratively shown as two single pole single throw switches but are otherwise similar to the first and second set of switches 319, 323. The third set of switches are also controlled by the mode control block 312 and are also normally closed for cyclic minimize mode and normally open for normal mode to avoid unnecessary processing when the autopilot program 302 is not in cyclic minimize mode.

The outputs of the third set of switches 335 are presented to a direction of flight transform block 336, which mathematically projects the pitch cyclic and roll cyclic command signals 330, 332 from the actual axes onto the virtual axes to produce corresponding virtual pitch and virtual roll signals on lines 338, 340 respectively, using the following translation of axes equations:

virtual pitch=(pitch cyclic command)*(cos (φ))−(roll cyclic command)*(sin (φ));

virtual roll=(pitch cyclic command)*(sin (φ))+(roll cyclic command)*(cos (φ)).

The virtual roll signal 340, represented in FIGS. 3–5 by the control vector's 220 lateral component 234, provides a relative indication of the amount of cyclic, i.e. control power, that is being commanded to counter the lateral component of the CG vector. If the magnitude of the virtual roll signal 340 is not zero, then the CG vector is not fully aligned with the direction of flight and further rotation is required for cyclic minimization. The virtual pitch signal 338 is not used, and therefore, its transformation equation could be eliminated from the direction of flight transform 336.

Although, the present embodiment determines when the CG is aligned with the direction of flight using translation of axis equations to provide an indication of the relative magnitude of the control power that is lateral to the direction of flight, any other suitable method known to those skilled in the art may be used, which may include but is not limited to, a lookup table in memory in conjunction with $\phi$ and the pitch and attitude commands or $\phi$ and the ratio of the pitch attitude command to roll attitude command. It is also believed that linear approximations may be used if $\phi$ is not too large, although with lower fidelity.

The virtual roll signal 340 is presented to a gain stage 342 which outputs a scaled virtual roll signal on line 344 that is passed through a limiter 346 to an integrator 348. The gain of the gain stage 342 and the transfer function of the limiter 346 combine to control the rotation rate that is commanded by the autopilot in aligning the CG vector with the direction of flight, which in turn impacts the amount of time that is taken to align the CG vector and the amount of rotation overshoot. In the present embodiment, the rate of rotation is preferably low to prevent any overshoot.

The operation of the cyclic minimizer is directed to longer term, steady state conditions, as opposed to shorter term, transient conditions. As such, the cyclic minimizer intentionally provides a slower response rate than that employed in other portions of the flight control system. It is believed that the cyclic minimizer rotation rate should not exceed ±5° per second (°/sec), which also avoids destabilizing the craft, preferably not exceeding ±0.5°/sec. However, in any situation, the designer may decide to further limit the rotation rate so that the cyclic minimizer provides even more of an average response to conditions occurring over an even longer period of time, such as ±0.05°/sec.

In cyclic minimize mode, the integrator 350 eventually forces the virtual roll signal to "zero", CG alignment, and produces a signal that is proportional to and tracking with the commanded rotation, $\phi$. Since as described above, the virtual roll signal is indicative of the relative magnitude of control power lateral to the direction of flight, the alignment of the CG vector with the direction of flight also results in the rotation of the craft until the lateral component of the control power is substantially "zero". The output of the integrator is passed through line 352 to the command re-direct and direction of flight transform blocks 320, 336 to be used in their respective transformations.

The output 352 of the integrator 350 is also passed to a summing junction 358 where it is summed with the heading command input signal 318 to produce a re-directed heading command signal on line 360 that is in reference to the actual axes and reflects the desired rotation $\phi$. The re-directed heading command 360 is presented to a heading hold control laws block 362 which provides an appropriate signal on line 364 to the set of mixing equations 334 for rotation of the vehicle.

The set of mixing equations 334 also receive signals 366 from other axis autopilot programs, e.g. collective pitch, not shown, in the flight control program. The mixing equations produce a set of output signals 368 that are presented by the output section 370, through lines 176, to the UAV actuators 156 (FIG. 2).

Those skilled in the art should recognize that the first, second and third sets of switches 319, 323, 335 can all be omitted if the additional processing is tolerable. In selecting such an alternative, steps should also be taken to maintain $\phi$ at zero and/or isolate the output of the integrator when the autopilot is not in cyclic minimize mode.

It should be noted that the UAV has two counter-rotating rotors which are normally commanded to the same collective position. To rotate, the UAV uses a differential collective technique which varies the collective of the rotors by an equal and opposite amount and thereby creates a net rotating force without effecting the total aircraft lift.

The UAV flight control program has autopilot and manual modes. The autopilot program, described above, is active when the flight control program is in one of its various autopilot modes, e.g. attitude hold, velocity hold, heading hold, altitude hold, position hover and turning modes. The autopilot program comprises an autopilot portion for each axis. Each mode of the autopilot program involves one or more of the axis autopilot portions.

In flight, the UAV always has one or more autopilot modes active for the pitch and roll axes because they require stabilization and the stabilization has been located in the autopilots. The yaw axis autopilot is engaged for flight as a matter of course. An autopilot mode may also be selected for collective. Except for collective, manual modes are used only on the ground. The tasks associated with changing between autopilot and manual modes are performed by another portion, not shown, of the flight control program. Changing modes requires that various values be properly initialized.

The cyclic minimizer must be used in association with an autopilot mode which has the capability to rotate the craft, yaw axis, preferably heading hold. For the pitch and roll axes in the UAV 10, the cyclic minimizer is used in conjunction with the autopilot in attitude hold mode, however, those of ordinary skill in the art will recognize that airspeed hold could also be used. One way to use the cyclic minimizer with an airspeed hold system is to have an airspeed hold algorithm that produces a pitch attitude command; a roll attitude command could also be produced but roll attitude is generally zero in an airspeed hold system. This pitch attitude command, and the roll attitude command or alternatively zero, are then input to the cyclic minimizer in the same manner as that shown for the pitch and roll attitude commands in FIG. 6.

It should be understood that while FIG. 6 provides a functional block diagram illustration for teaching of the invention, the best mode of the present invention is in software.

Referring now to FIG. 7, a flowchart diagram illustrates the step execution of the cyclic minimizer algorithm of the present invention within the autopilot program. The flight control computer enters the portion 302 of the autopilot program at 402, and decision block 404 determines whether the autopilot program is operating in cyclic minimizer mode, if not, $\phi$ is set to zero at instruction 406, if so, instructions 408 translate the pitch and roll attitude commands into the redirected pitch and redirected roll commands, and set the redirected heading hold command to the heading hold command plus $\phi$. Instructions 410 perform the pitch attitude, roll attitude and heading control laws which produce corresponding cyclic commands and differential collective commands (yaw) for the set of mixing equations.

If the portion 302 of the autopilot program is not operating in cyclic minimizer mode, then decision block 411 passes execution to instructions 428, described hereinbelow.

Instructions 412 translate the pitch cyclic command and roll cyclic command to a virtual pitch and a virtual roll and instruction 414 sets the scaled virtual roll to the virtual roll multiplied by gain Ki. Instruction 416 sets the cyclic minimizer rotation rate command to the scaled virtual roll. Decision block 418 determines if the cyclic minimizer rotation rate is greater than the positive limit, if so, it is set equal to the positive limit at instruction block 420.

Decision block 422 determines if the cyclic minimizer rotation rate is less than the negative limit, if so, instruction block 424 set it equal to the negative limit.

Instructions 426 update φ by adding to it the product of the cyclic minimizer rotation rate and delta time. Delta time is the amount of time which has elapsed since the last update of φ. The rest of the autopilot program is executed at instructions 428 which is well known to those skilled in the art. The autopilot program is exited at 430.

The cyclic minimizer of the present invention is not limited to the steps and order of the flowchart illustrated in FIG. 7. For example, an updated φ could be produced first, based upon the old φ and pitch/roll cyclic commands, and then the updated φ could be used to redirect the input commands. This means that if decision block 404 determines that the mode is cyclic minimize, then steps 412 through 426 could be executed before step 408 is executed. This might also eliminate the need for decision block 411.

It should be understood by those skilled in the art that although the disclosed embodiment of the cyclic minimizer is in programmed hardware, i.e. executed in software by a general purpose computer, it may take other forms, including hardwired hardware configurations and/or hardware manufactured in integrated circuit form, or other hardware/software configurations which may or may not include firmware.

In the best mode embodiment, the translation of axis performed on the pitch and roll attitude commands and heading command input are preferably done in the UAV. However, this does not preclude doing them elsewhere, such as on the ground prior to sending the commands over the uplink. Of course, in so doing, the ground station would need to know the extent that the craft has been rotated in aligning the CG vector with the direction of flight. One would also need to be concerned about the introduction of delays in such a system which could introduce instability. It is also believed that this translation could be retained in the UAV but moved from the input command to elsewhere in the processing path, which may or may not negate the need for the translation in the feedback path.

Similarly, the translation in the feedback path may also be moved and while the present invention preferably uses an integrator in the feedback path track the commanded rotation and force the CG vector into full alignment, other configurations are also possible. For instance, a proportional path may be used or added in parallel to the integrator and summed in at the input to the limiter, to allow customizing of the response to the application. Or for example, a "linear" or "comparator" function may be used to determine alignment and/or the commanded rotation may be tracked in another way.

The cyclic minimizer of the present invention may also be used in other unmanned symmetrical rotary wing vehicles and applications to reduce the required cyclic and power. The use of the present invention is not dependent on whether the aircraft is rotated by the use of differential collective with counter-rotating rotors, or some other form of rotation, yaw. Nor is it dependent upon the particular shape of the airframe so long as it is generally aerodynamically symmetrical so that the gain associated with aligning the CG vector with the direction of flight is not outweighed by loss in aerodynamic efficiency.

Although the cyclic minimizer of the present invention provides a reduction in both required cyclic and power in rotary wing vehicles, the present invention may also be used to simply reduce power in other types of unmanned symmetrical aerial vehicles which are not considered rotary wing or which are rotary wing but do not use the same axes conventions as the UAV above. Regardless of the lift/thrust technology and positional reference system employed, aerial vehicles have a CG vector and can achieve a reduction in the required control power by aligning the CG vector with the direction of flight. Therefore, the present invention may also be employed in aircraft which do not use cyclic, including but not limited to crafts using vector thrust engines, i.e. jets, and ducted fan crafts which direct and/or vector the airstream with ducts or surfaces. In light of the above disclosure, suitable implementations of the present invention in other applications will be obvious to those of ordinary skill in the art.

Furthermore, while the particular invention has been described with reference to illustrative embodiments, this description is not meant to be construed in a limiting sense. It is understood that, various modifications of the illustrative embodiments, as well as additional embodiments of the invention, will be apparent to persons skilled in the art upon reference to this description without departing from the spirit of the invention, as recited in the claims appended hereto. Thus, upon understanding the present invention, one of ordinary skill in the art could employ the present invention in a variety of autopilot applications. Those skilled in the art will know of the forms which are suitable for each application. It is therefore contemplated that the appended claims will cover any such modifications or embodiments as fall within the true scope of the invention.

What is claimed is:

1. Apparatus for controlling an unmanned generally aerodynamically symmetric aircraft having a geometric center, a center of gravity, and a direction of flight, the apparatus useful to align the horizontal component of a center of gravity vector with the horizontal component of a direction of flight vector, the center of gravity vector represented by a line from the geometric center to the center of gravity, and the direction of flight vector represented by a line from the geometric center in the direction of flight, wherein the aircraft can be rotated about its geometric center, the apparatus comprising:

detection means for detecting the presence of misalignment between the horizontal components of the center of gravity and direction of flight vectors, and for providing a rotation signal indicative of the desired rotation of the aircraft to align the horizontal components of the center of gravity and direction of flight vectors; and rotation means, responsive to said detection means, for providing, in the presence of said rotation signal, rotation of the unmanned generally aerodynamically symmetric aircraft about its geometric center to align the horizontal components of the center of gravity and direction of flight vectors.

2. The apparatus of claim 1 wherein said rotation means comprises a re-direct transform, responsive to a first set of at least one command signal and said detection means, for providing re-direction of said first set of at least one command signal in a manner proportionate to the magnitude of said rotation signal.

3. The apparatus of claim 2 wherein said first set of at least one re-directed command signal is presented to a control portion which produces at least one control signal; and said detection means comprises a direction of flight transform, responsive to said at least one control signal, and said detection means rotation signal, for detecting the presence of misalignment between the horizontal components of the center of gravity and direction of flight vectors.

4. The apparatus of claim 3 wherein said rotation means comprises a summation, responsive to a second set of at least one command signal and said detection means, for providing re-direction of said second set of at least one command signal, said re-direction produced by summing each of said second set of at least one command signal with an amount generally proportionate to the magnitude of said rotation signal.

5. The apparatus of claim 4 wherein said at least one control signal comprises pitch and roll cyclic command signals, said first set of at least one command signal comprises pitch and roll attitude command signals, and said second set of at least one command signal comprises a heading command signal.

6. The apparatus of claim 1 wherein said detection means and said rotation means comprise a software program executed by a computer.

7. The apparatus of claim 1 wherein said detection means comprises a direction of flight transform, responsive to said detection means rotation signal, for detecting the presence of misalignment between the horizontal components of the center of gravity and direction of flight vectors.

8. The apparatus of claim 1 wherein said rotation signal has a magnitude, and said magnitude is modified by an amount that is generally proportional to the magnitude of the misalignment between the horizontal components of the center of gravity and direction of flight vectors.

9. The apparatus of claim 1 wherein said rotation means comprises a summation, responsive to a second set of at least one command signal and said detection means, for providing re-direction of said second set of at least one command signal, said re-direction produced by summing each of said second set of at least one command signal with an amount generally proportional to the magnitude of said rotation signal.

10. Apparatus for controlling an unmanned generally aerodynamically symmetric rotary wing aircraft having a geometric center, a center of gravity, and a direction of flight, the apparatus useful to align the horizontal component of a center of gravity vector with the horizontal component of a direction of flight vector, the center of gravity vector represented by a line from the geometric center to the center of gravity, and the direction of flight vector represented by a line from the geometric center in the direction of flight, wherein the aircraft can be rotated in its yaw axis about its geometric center, the apparatus comprising:

detection means for detecting the presence of misalignment between the horizontal components of the center of gravity and direction of flight vectors, and for providing a rotation signal indicative of the desired rotation of the aircraft to align the horizontal components of the center of gravity and direction of flight vectors; and rotation means, responsive to said detection means, for providing, in the presence of said rotation signal, rotation of the unmanned generally aerodynamically symmetric rotary wing aircraft about its geometric center to align the horizontal componets of the center of gravity and direction of flight vectors.

11. The apparatus of claim 10 wherein said rotation means comprises a re-direct transform, responsive to a pitch axis command signal, a roll axis command signal and said detection means, for providing re-direction of said pitch and roll axis command signals in a manner proportionate to the magnitude of said rotation signal.

12. The apparatus of claim 11 wherein said re-directed pitch and roll axis command signals are presented to a control portion which produces at least one control signal; and said detection means comprises a direction of flight transform, responsive to said at least one control signal, and said detection means rotation signal, for detecting the presence of misalignment between the horizontal components of the center of gravity and direction of flight vector.

13. The apparatus of claim 12 wherein said at least one control signal comprises pitch and roll cyclic command signals.

14. The apparatus of claim 13 wherein said pitch and roll axis command signals comprise pitch and roll attitude command signals, and said yaw axis command signal comprises a heading command signal.

15. The apparatus of claim 12 wherein said rotation means comprises a summation, responsive to a yaw axis command signal and said detection means, for providing re-direction of said yaw axis command signal, said re-direction produced by summing said yaw command signal with an amount generally proportionate to the magnitude of said rotation signal.

16. The apparatus of claim 10 wherein said detection means and said rotation means comprise a software program executed by a computer.

17. The apparatus of claim 10 wherein said detection means comprises a direction of flight transform, responsive to said detection means rotation signal, for detecting the presence of misalignment between the horizontal components of the center of gravity and direction of flight vectors.

18. The apparatus of claim 10 wherein said rotation signal has a magnitude, and said magnitude is modified by an amount that is generally proportional to the magnitude of the misalignment between the horizontal components of the center of gravity and direction of flight vectors.

19. The apparatus of claim 10 wherein said rotation means comprises a summation, responsive to a yaw axis command signal and said detection means, for providing re-direction of said yaw axis command signal, said re-direction produced by summing said yaw axis command signal with an amount generally proportional to the magnitude of said rotation signal.

20. A method for controlling an unmanned generally aerodynamically symmetric aircraft having a geometric center, a center of gravity, and a direction of flight, the method useful to align the horizontal component of a center of gravity vector with the horizontal component of a direction of flight vector, the center of gravity vector represented by a line from the geometric center to the center of gravity, and the direction of flight vector represented by a line from the geometric center in the direction of flight, wherein the aircraft can be rotated about its geometric center, the method comprising the steps of:

detecting the presence of misalignment between the horizontal components of the center of gravity vector and the direction of flight vector, and providing a rotation signal indicative of the desired rotation of the aircraft to align the horizontal components of the center of gravity and direction of flight vectors; and rotating the unmanned generally aerodynamically symmetric aircraft about its geometric center, in response to said rotation signal, to align the horizontal components of the center of gravity and direction of flight vectors.

21. The method of claim 20 wherein said step of rotating further comprises the step of transforming a first set of at least one command signal, in a manner proportionate to the magnitude of said rotation signal, to produce a first set of at least one re-directed command signal.

22. The method of claim 21 wherein said step of rotating further comprises the step of presenting said first set of at least one re-directed command signal to a control portion which produces at least one control signal; and said step of detecting further comprises the step of transforming said at least one control signal to produce a misalignment signal indicative of the presence of misalignment between the horizontal components of the center of gravity and direction of flight vectors.

23. The method of claim 22 wherein said step of rotating further comprises summing a second set of at least one command signal with an amount generally proportional to the magnitude of said rotation signal to produce a second set of at least one re-directed command signal.

24. The method of claim 23 wherein said at least one control signal comprises pitch and roll cyclic command signals, said first set of at least one command signal comprises pitch and roll attitude command signals, and said second set of at least one command signal comprises a heading command signal.

25. The method of claim 20 wherein said step of detecting and said step of rotating further comprise the use of a software program executed by a computer.

26. The method of claim 20 wherein said step of detecting further comprises the step of transforming at least one control signal to produce a misalignment signal indicative of the presence of misalignment between the horizontal components of the center of gravity and direction of flight vectors.

27. The method of claim 20 wherein said rotation signal has a magnitude, and said magnitude is modified by an amount that is generally proportional to the magnitude of the misalignment between the horizontal components of the center of gravity and direction of flight vectors.

28. The method of claim 20 wherein said step of rotating further comprises the step of summing a second set of at least one command signal with an amount generally proportionate to the magnitude of said rotation signal, to provide a second set of at least one re-directed command signal.

29. A method for controlling an unmanned generally aerodynamically symmetric rotary wing aircraft having a geometric center, a center of gravity, and a direction of flight, the method useful to align the horizontal component of a center of gravity vector with the horizontal component of a direction of flight vector, the center of gravity vector represented by a line from the geometric center to the center of gravity, and the direction of flight vector represented by a line from the geometric center in the direction of flight, wherein the aircraft can be rotated in its yaw axis about its geometric center, the method comprising the steps of:

detecting the presence of misalignment between the horizontal components of the center of gravity vector and the direction of flight vector and, providing a rotation signal indicative of the desired rotation of the aircraft to align the horizontal components of the center of gravity and direction of flight vectors; and rotating the unmanned generally aerodynamically symmetric rotary wing aircraft about its geometric center, in response to said rotation signal, to align the horizontal components of the center of gravity and direction of flight vectors.

30. The method of claim 29 wherein said step of rotating further comprises the step of transforming a pitch axis command signal and a roll axis command signal, in a manner proportionate to the magnitude of said rotation signal, to produce re-directed pitch axis and roll axis command signals.

31. The method of claim 30 wherein said step of rotating further comprises the step of presenting said re-directed pitch and roll axis command signals to a control portion which produces at least one control signal; and said step of detecting further comprises the step of transforming said at least one control signal to produce a misalignment signal indicative of the presence of misalignment between the horizontal components of the center of gravity and direction of flight vectors.

32. The method of claim 31 wherein said step of rotating further comprises summing a yaw axis command signal with an amount generally proportional to the magnitude of said rotation signal to produce a re-directed yaw axis command signal.

33. The method of claim 32 wherein said at least one control signal comprises pitch and roll cyclic command signals.

34. The method of claim 31 wherein said pitch and roll axis command signals comprise pitch and roll attitude command signals, and said yaw axis command signal comprises a heading command signal.

35. The method of claim 29 wherein said step of detecting and said step of rotating further comprise the use of a computer executing a software program.

36. The method of claim 29 wherein said step of detecting further comprises the step of transforming at least one control signal to produce a misalignment signal indicative of the presence of misalignment between the horizontal components of the center of gravity and direction of flight vectors.

37. The method of claim 29 wherein said rotation signal has a magnitude, and said magnitude is modified by an amount that is generally proportional to the magnitude of the misalignment between the horizontal components of the center of gravity and direction of flight vectors.

38. The method of claim 29 wherein said step of rotating further comprises the step of summing a yaw axis command signal with an amount generally proportionate to the magnitude of said rotation signal, to provide a re-directed yaw axis command signal.

* * * * *